United States Patent
Calleja

(12) 
(10) Patent No.: US 6,402,167 B1
(45) Date of Patent: Jun. 11, 2002

(54) PALLET-CART TRANSPORTER

(76) Inventor: Michael J. Calleja, 110 San Benito Rd., Brisbane, CA (US) 94005

( * ) Notice: Subject to any disclaimer, the term of this patent is extended or adjusted under 35 U.S.C. 154(b) by 0 days.

(21) Appl. No.: 09/717,759

(22) Filed: Nov. 21, 2000

(51) Int. Cl.[7] .................................................. B62B 1/00
(52) U.S. Cl. ................ 280/79.3; 280/47.35; 280/43.12; 108/55.1
(58) Field of Search .............................. 280/79.3, 47.18, 280/47.34, 47.35, 43.12; 108/55.1, 107

(56) References Cited

U.S. PATENT DOCUMENTS

| | | | | |
|---|---|---|---|---|
| 942,174 A | * | 12/1909 | Hendricks ................. | 280/47.34 |
| 3,577,937 A | * | 5/1971 | Sjoblom .................... | 108/55.1 |
| 3,589,746 A | * | 6/1971 | Inglis ........................ | 280/79.3 |
| 3,850,295 A | * | 11/1974 | Black ........................ | 206/304 |
| 3,855,944 A | * | 12/1974 | Skubic et al. ............. | 108/53.5 |
| 4,068,599 A | * | 1/1978 | Sapp et al. ................ | 108/55.1 |
| 4,105,218 A | * | 8/1978 | Newell ..................... | 280/43.12 |
| 5,257,794 A | * | 11/1993 | Nakamura ................. | 280/79.3 |
| 5,388,532 A | * | 2/1995 | Wakano ..................... | 108/55.1 |
| 5,718,441 A | * | 2/1998 | Kern et al. ................ | 280/79.3 |
| D402,140 S | * | 12/1998 | Bustos ....................... | D6/473 |
| 6,119,604 A | * | 9/2000 | Thomsen ................... | 108/55.1 |
| 6,244,194 B1 | * | 6/2001 | Salmanson et al. ....... | 108/55.1 |

\* cited by examiner

*Primary Examiner*—Robert P. Olszewski
*Assistant Examiner*—James S. McClellan
(74) *Attorney, Agent, or Firm*—Robert Charles Hill

(57) ABSTRACT

A pallet cart comprises four corner adapters that lock on to respective corners of an ordinary wooden pallet. A pair of ladder frames have vertical posts that fit at the bottom into each of the four corner adapters. The ladder frames support a system of wire-frame shelves at various parallel levels above the pallet. The pieces can be disassembled to lie flat.

6 Claims, 5 Drawing Sheets

PALLET-CART TRANSPORTER

BACKGROUND OF THE INVENTION

1. Field of the Invention

The present invention relates to material-handling systems, and more particularly to shelving and caster-wheel systems that attach to standard pallets.

2. Description of Related Art

Pallets of live plants are routinely delivered by truck to retail stores like The Home Depot, Orchard Supply Hardware, Wal-Mart, etc. A typical Chep pallet is 40" by 48" and fits quite loosely across the floor inside a typical eight-foot wide truck-trailer.

More plants and other materials can be stacked on shelves above each pallet to take advantage of the vertical height inside a truck trailer or warehouse. But using wooden pallets for each of the higher stages consumes a lot of vertical room.

Floor rollers, conveyers, and wheeled dollies have been conventionally used to move materials around warehouses and in and out of truck-trailers. It is more convenient when the wheels are a part of the carts themselves.

A typical live plant distribution system returns to the dispatch office with empty carts. Unless those carts can collapse to save room, a lot of space is wasted that might otherwise be employed.

SUMMARY OF THE INVENTION

Briefly, a pallet cart embodiment of the present invention comprises four corner adapters that lock on to respective corners of an ordinary wooden pallet. A pair of ladder frames have vertical posts that fit at the bottom into each of the four corner adapters. The ladder frames support a system of wire-frame shelves at various parallel levels above the pallet. The pieces can be disassembled to lie flat.

An advantage of the present invention is that a cart is provided that makes useful equipment from otherwise unused pallets.

Another advantage of the present invention is that a corner-adapter is provided that allows shelving to be assembled over a pallet.

A further advantage of the present invention is that caster-wheel assemblies are provided that can be used to convert a pallet into a roll-around cart or tray.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
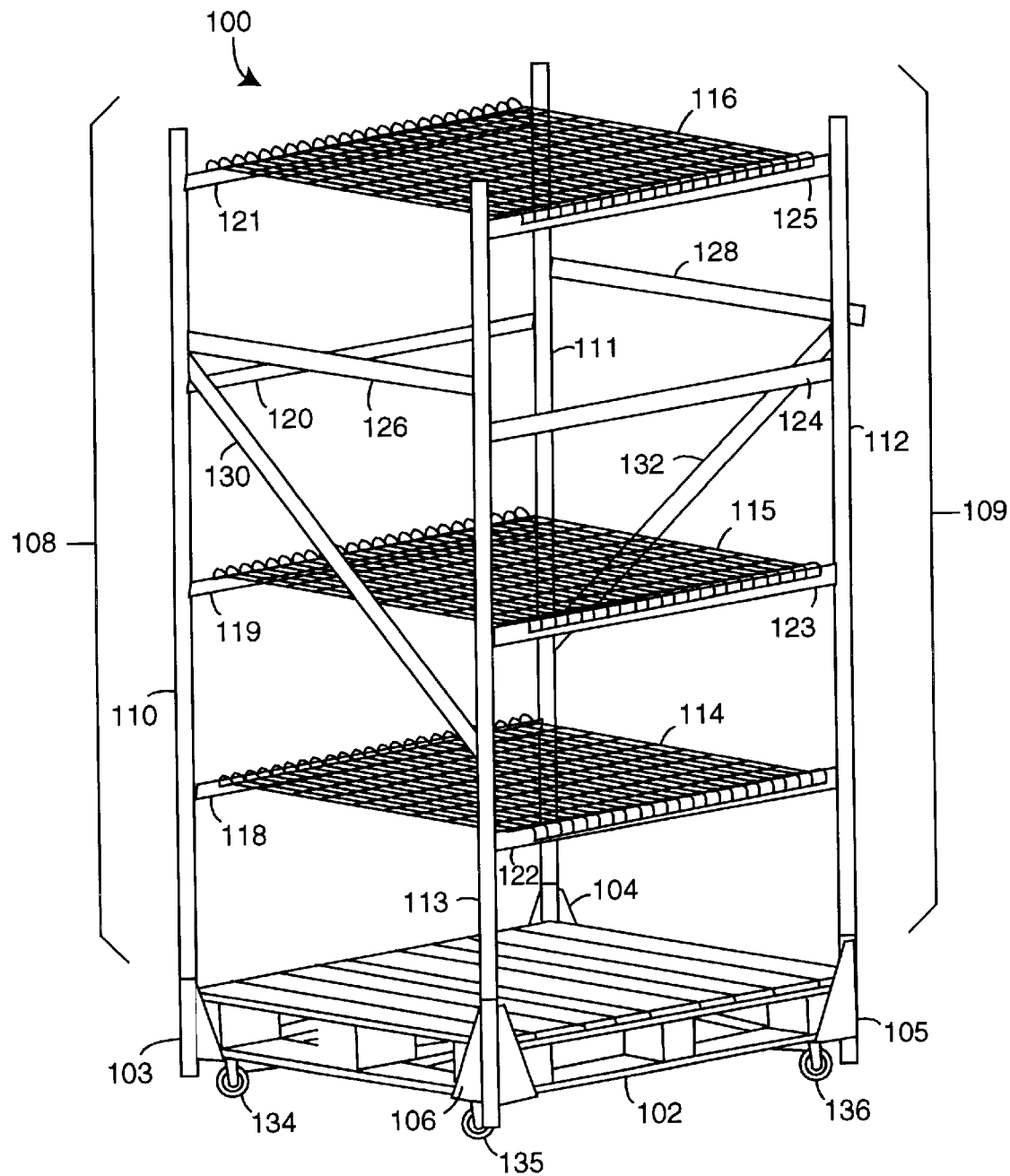
FIG. 1 is a perspective view of a cart embodiment of the present invention.

FIG. 1 illustrates a cart embodiment of the present invention, referred to herein by the reference numeral 100.

In this example, a roll-around cart suitable for use in a garden nursery is shown assembled. The cart 100 comprises a wooden pallet 102 to which are attached a set of four corner adapters 103–106. A pair of ladder frames 108 and 109 share four columns 110–113 between them that each plug into the tops of the corner adapters 103–106. A number of wire-frame shelves 114–116 attach inside between the ladder frames, e.g., by hooking over rungs that truss between columns 110–111 and 112–113. For example, a set of rungs 118–121 brace one pair of columns 110 and 111, and a second set of rungs 122–125 brace the other pair of columns 112 and 113. At right angles to these are a pair of cross braces 126 and 128, and a pair of diagonal braces 130 and 132. If the cart 100 needs to be able to be rolled around on the floor, wheels and/or casters can be added, e.g., caster wheels 134–136.

Figure 2A:
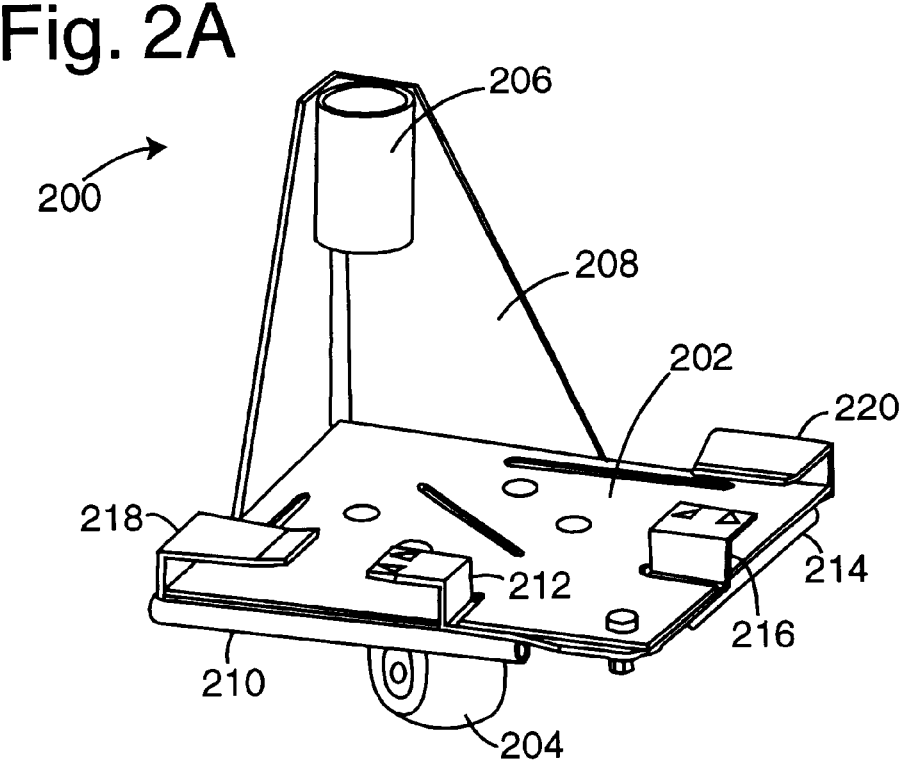
FIGS. 2A and 2B are perspective views of a typical corner adapter that can be fitted to the wooden pallet of FIG. 1.
Figure 2B:
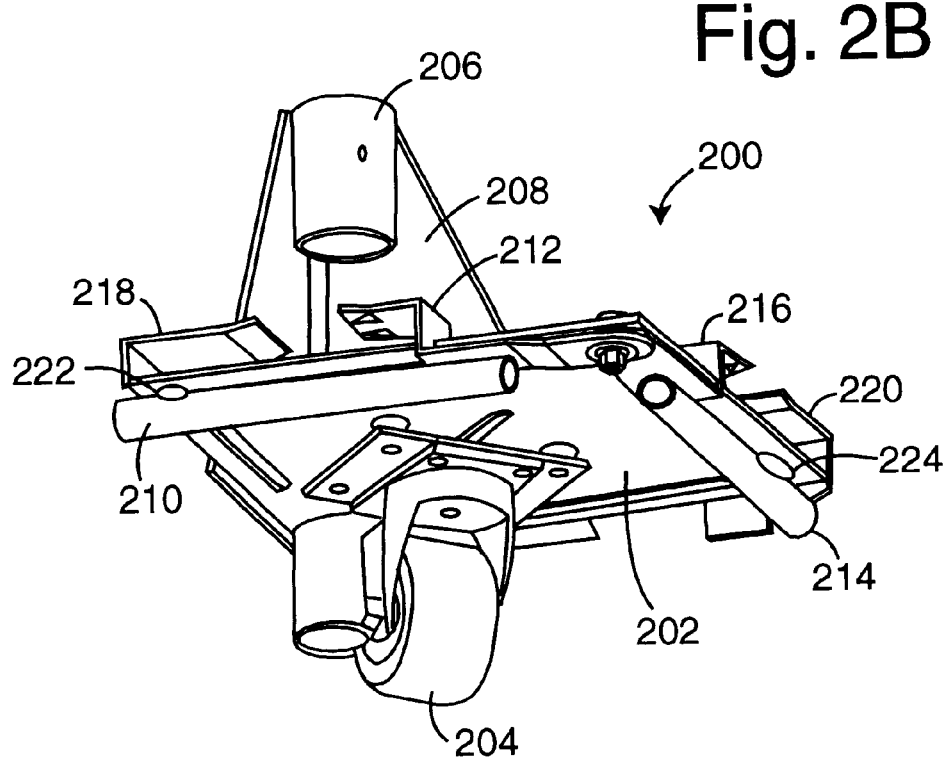

FIGS. 2A and 2B show a corner adapter 200 that comprises a base plate 202, a caster wheel 204, and a top post pocket 206 supported by a webbing 208. A lever 210 operates a pallet clip 212, and a second lever 214 operates a second pallet clip 216. A pair of outside edge clips 218 and 220 are intended to slip over pieces of lumber in the wooden pallet and the top of the base plate 202 supports a bottom corner of the pallet. The corner adapter 200 is locked on to the wooden pallet by rotating handles 210 and 214 so that clips 212 and 216 will capture a part of the pallet structure.

A single dimple 222 in base plate 202 is stamped in so that handle 210 will snap in behind it. Similarly, another dimple 224 is also stamped into the base plate 202 to hold in handle 214. These are preferred over notches that could be cut into the bottom edges of clips 218 and 220.

If the top post pocket 206 and webbing 208 are kept relatively short, several corner adapters 200 can be conveniently stacked one upon the other, e.g., for storage after disassembly of the cart 100.

Figure 3:
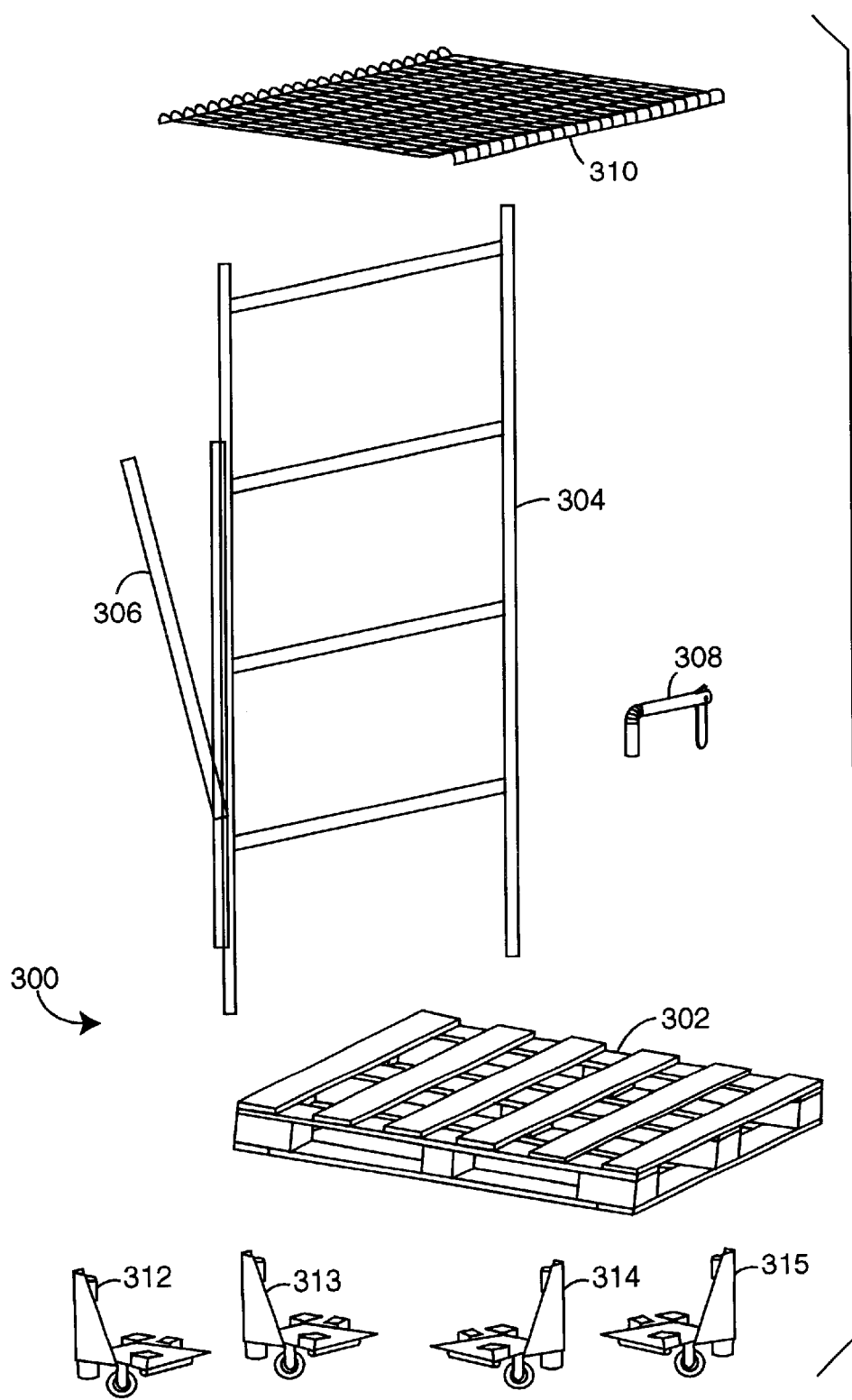
FIG. 3 is an exploded assembly diagram of a cart embodiment of the present invention like that of FIG. 1.

FIG. 3 represents a group of pieces that can be used to partially assemble a cart 300. Such comprises a wooden pallet 302, a ladder piece 304, a diagonal brace 306, a clip 308, a wire-frame shelf 310, and four corner adapters 312–315. Two such ladder pieces 304 are plugged into the corner adapter 312–315 after their being attached to the wooden pallet 302. The diagonal braces 306 interconnect the ladder pieces 304 and are pinned with clips 308. As many shelves 310 can be used as there are rungs to hold them on ladder pieces 304.

Figure 4:
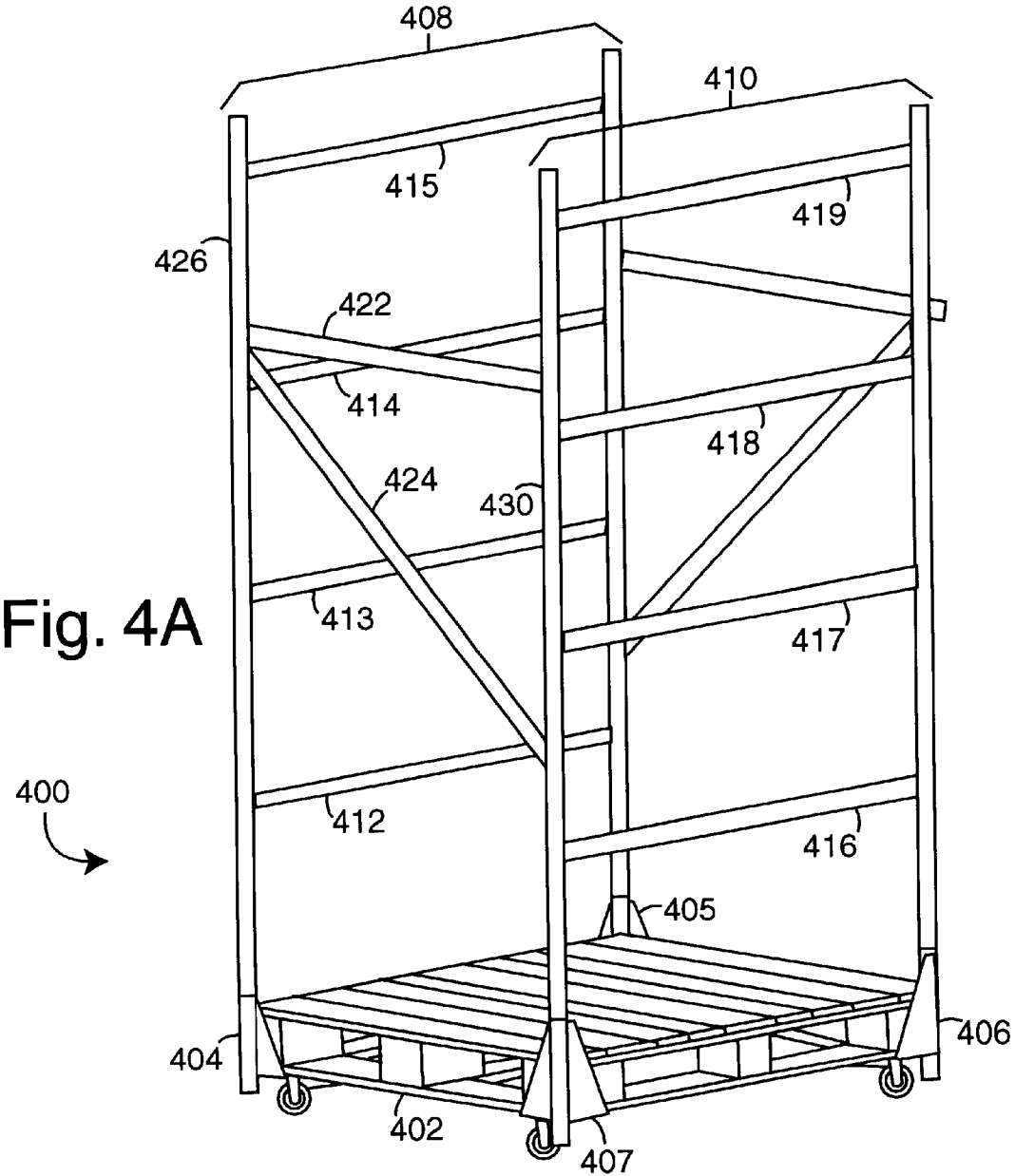
FIGS. 4A–4C are perspective diagrams of an assembled car like that of FIGS. 1–3.

FIGS. 4A–4C show an assembled cart 400 but without the shelves yet hung. A wooden pallet 402 has fastened to it a set of four corner adapters 404–407. A pair of ladder frames 408 and 410 are plugged down into the corner adapters 404–407, and can be secured with bolts or set screws. Each ladder frame has a corresponding set of horizontal rungs 412–415 and 416–419 onto which shelves can be placed or hung. FIG. 4B shows how a bolt 420 is used to secure a truss 422 and diagonal brace 424 to a vertical column 426. FIG. 4C shows how the truss 422 can be secured with a removable pin 428 to another vertical column 430.

Figure 5:
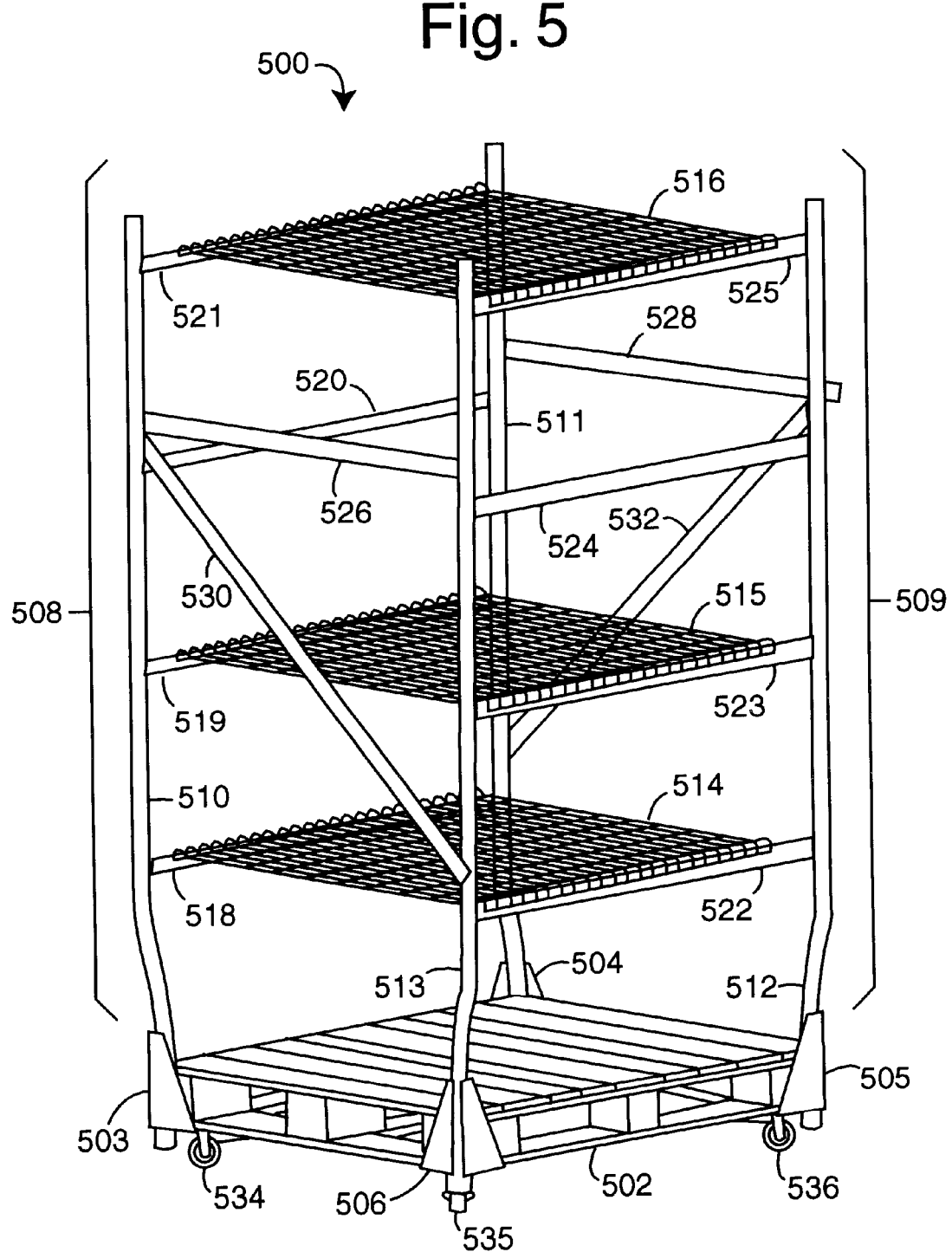
FIG. 5 is a perspective diagram of a flared side cart embodiment of the present invention.

FIG. 5 illustrates an alternative flare-sided cart embodiment of the present invention, referred to herein by the reference numeral 500. Such flare-sided roll-around cart preferred for use in a truck-trailers is shown assembled. The cart 500 comprises a wooden pallet 502 to which are attached a set of four corner adapters 503–506. Such pallet 502 is typically a Chep or block type that is 40" by 48". A ladder frame 508 is bent out to cantilever beyond the area of the pallet 502. An opposite-side ladder frame 509 is bent the other way to cantilever out beyond the other edge of the pallet 502. This gives the whole cart an outside dimension of about 44" by 48", and such fits better in numbers into a standard truck-trailer cargo area.

The two ladder frames respectively comprise columns 510–513, and are made of metal. For example, tubular steel or aluminum. Such metal tubing is easily bent into the S-shapes shown in FIG. 5.

A number of wire-frame shelves 514–516 attach inside the frame, e.g., by hooking over ladder rungs that truss between the columns 510–513. For example, a set of trusses 518–521 brace one pair of columns 510 and 511, and a second set of trusses 522–525 brace the other pair of columns 512 and 513. At right angles to these are a pair of cross braces 526 and 528, and a pair of diagonal braces 530 and 532. If the cart 500 needs to be able to be rolled around on the floor, wheels and/or casters can be added, e.g., caster wheels 534–536.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A cart, comprising:

a set of four corner adapters for fastening onto respective comes of a wooden pallet, and each having a post pocket on an upper side;

a pair of ladder frames for plugging into respective pairs of said post pockets, and further including parallel horizontal rungs between parallel vertical columns; and a plurality of shelves for hanging on opposite ones of said parallel horizontal rungs; and each of the set of corner adapters having a rotating clip controlled by a handle that can be manipulated by a user to lock such corner adapter on said wooden pallet, wherein each of the set of corner adapter has a dimple in a base plate behind which said rotating handle can snap and be held in place.

2. The cart of claim 1, wherein:

the plurality of shelves comprise individual wire-frame shelves.

3. The cart of claim 1, further comprising:

a wheel attached to a bottom side of each of the set of four corner adapters.

4. The cart of claim 1, wherein:

each of the set of corner adapters is such that said post pocket is short enough to permit several such corner adapters to be stacked one upon the other in storage.

5. The cart of claim 1, wherein:

each of the pair of ladder frames have their respective vertical columns bent in an outward flare so that each of the plurality of shelves has an area that exceeds that of said wooden pallet.

6. The cart of claim 1, wherein:

each of the pair of ladder frames have their respective vertical columns bent so that said parallel horizontal rungs on each side cantilever out beyond said corner adapters when plugged into said post pockets.

* * * * *